US012641611B2

(12) United States Patent
Liang et al.

(10) Patent No.: US 12,641,611 B2
(45) Date of Patent: May 26, 2026

(54) UPLINK CONTROL INFORMATION SENDING METHOD AND RECEIVING METHOD, APPARATUSES, DEVICE, AND MEDIUM

(71) Applicant: GUANGDONG OPPO MOBILE TELECOMMUNICATIONS CORP., LTD., Dongguan (CN)

(72) Inventors: Bin Liang, Dongguan (CN); Jing Xu, Dongguan (CN); Yanan Lin, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 405 days.

(21) Appl. No.: 18/332,186

(22) Filed: Jun. 9, 2023

(65) Prior Publication Data

US 2023/0345495 A1     Oct. 26, 2023

Related U.S. Application Data

(63) Continuation of application No. PCT/CN2021/071924, filed on Jan. 14, 2021.

(51) Int. Cl.
*H04W 72/21* (2023.01)
*H04W 72/0446* (2023.01)
(Continued)

(52) U.S. Cl.
CPC ....... *H04W 72/21* (2023.01); *H04W 72/0446* (2013.01); *H04W 72/0453* (2013.01); *H04W 72/566* (2023.01)

(58) Field of Classification Search
CPC ............. H04W 72/21; H04W 72/0446; H04W 72/0453; H04W 72/566; H04L 5/0005;
(Continued)

(56) References Cited

U.S. PATENT DOCUMENTS

| | | | |
|---|---|---|---|
| 11,910,382 B2 * | 2/2024 | Wang | H04W 72/1268 |
| 2019/0313419 A1 | 10/2019 | Fakoorian et al. | |

(Continued)

FOREIGN PATENT DOCUMENTS

| | | |
|---|---|---|
| CN | 109392169 | 2/2019 |
| CN | 110831219 | 2/2020 |

(Continued)

OTHER PUBLICATIONS

OPPO, "Summary#1 of email thread [103-e-NR-IIOT_URLLC_enh-04]," 3GPP TSG RAN WG1 #102-e, R1-2009546, Aug. 2020.
(Continued)

*Primary Examiner* — Brian T O Connor
(74) *Attorney, Agent, or Firm* — Hodgson Russ LLP

(57) ABSTRACT
The present application relates to the field of communication technology and discloses an uplink control information sending method and receiving method, apparatuses, a device, and a medium. The present method is applied in a terminal device and comprises: determining a first transmission resource, the first transmission resource being used for sending first uplink control information and second uplink control information; wherein the first transmission resource comprises: a first transmission sub-resource and a second transmission sub-resource, the first transmission sub-resource being used for bearing the first uplink control information, and the second transmission sub-resource being used for bearing the second uplink control information.

15 Claims, 3 Drawing Sheets

Uplink control information transmission sub-resource corresponding to URLLC

Uplink control information transmission sub-resource corresponding to eMBB

DMRS for receiving demodulation

Temporary PUCCH resource

(51) Int. Cl.
  *H04W 72/0453* (2023.01)
  *H04W 72/566* (2023.01)
(58) Field of Classification Search
  CPC ... H04L 5/0048; H04L 5/0064; H04L 5/0094;
  H04L 5/0053; H04L 5/0051
  See application file for complete search history.

(56) References Cited

U.S. PATENT DOCUMENTS

| | | | | | |
|---|---|---|---|---|---|
| 2021/0014854 | A1* | 1/2021 | Gao | ............... | H04L 1/1861 |
| 2021/0084644 | A1* | 3/2021 | Bae | ............... | H04B 7/0626 |
| 2021/0307004 | A1* | 9/2021 | Zhang | ............... | H04L 1/1819 |
| 2022/0132496 | A1* | 4/2022 | Lu | ............... | H04W 72/21 |
| 2022/0361164 | A1* | 11/2022 | Li | ............... | H04L 5/0053 |
| 2023/0143675 | A1* | 5/2023 | Li | ............... | H04W 72/1268 |
| | | | | | 370/329 |
| 2023/0189274 | A1* | 6/2023 | Li | ............... | H04L 1/1671 |
| | | | | | 370/336 |

| | | | | | |
|---|---|---|---|---|---|
| 2025/0089085 | A1* | 3/2025 | Yin | ............... | H04L 1/1864 |

FOREIGN PATENT DOCUMENTS

| | | |
|---|---|---|
| CN | 111835480 | 10/2020 |
| EP | 3761735 | 1/2021 |
| WO | 2019216740 | 11/2019 |

OTHER PUBLICATIONS

OPPO, "Enhancements on intra-UE multiplexing/prioritization," 3GPP TSG RAN WG1 #103-e, R1-2008282, Oct. 2020.

Huawei et al., "Intra-UE multiplexing enhancements," 3GPP TSG RAN WG1 Meeting #103-e, R1-2007567, Oct. 2020.

WIPO, International Search Report and Written Opinion for PCT/ CN2021/071924, Sep. 28, 2021.

EPO, Extended European Search Report for EP Appl. No. 21918477. 7, Nov. 8, 2023.

\* cited by examiner

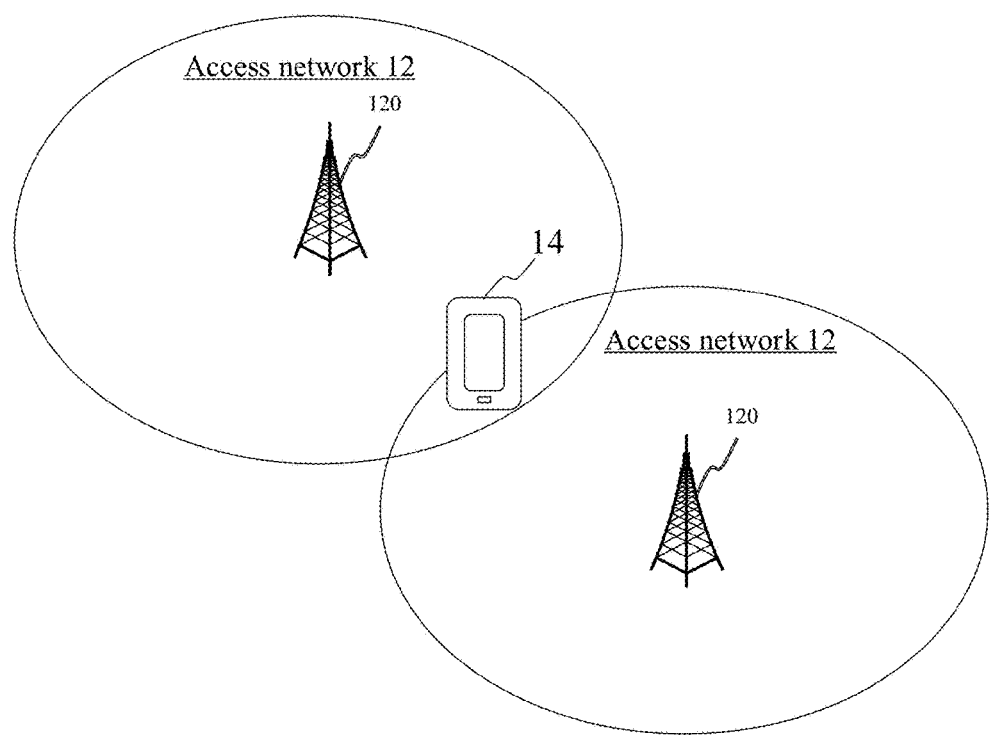

FIG. 1

Determine first transmission resource, first transmission resource being used for transmitting first uplink control information and second uplink control information, and first transmission resource comprising: first transmission sub-resource and second transmission sub-resource        210

FIG. 2

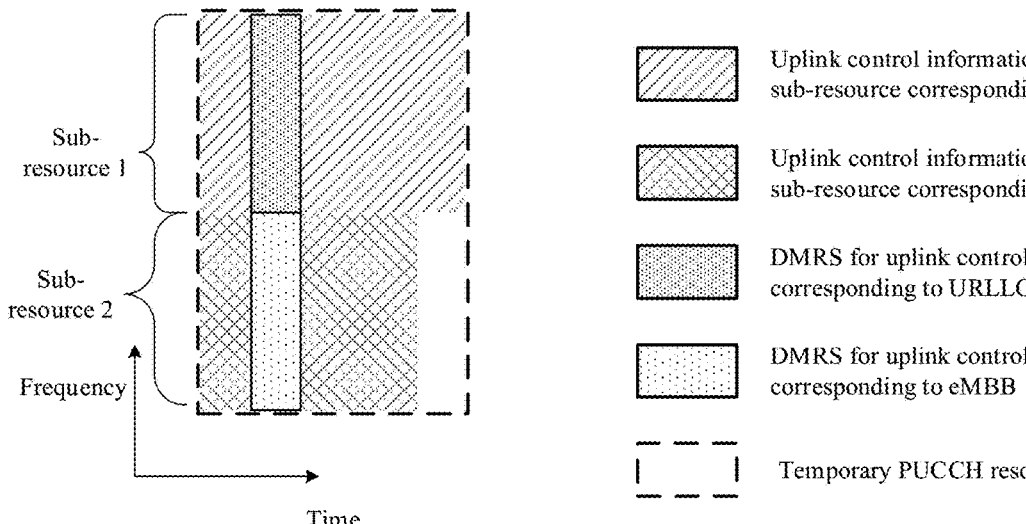

Sub-resource 1

Sub-resource 2

Frequency

Time

☐ Uplink control information transmission sub-resource corresponding to URLLC

☐ Uplink control information transmission sub-resource corresponding to eMBB

☐ DMRS for uplink control information corresponding to URLLC

☐ DMRS for uplink control information corresponding to eMBB

☐ Temporary PUCCH resource

FIG. 3

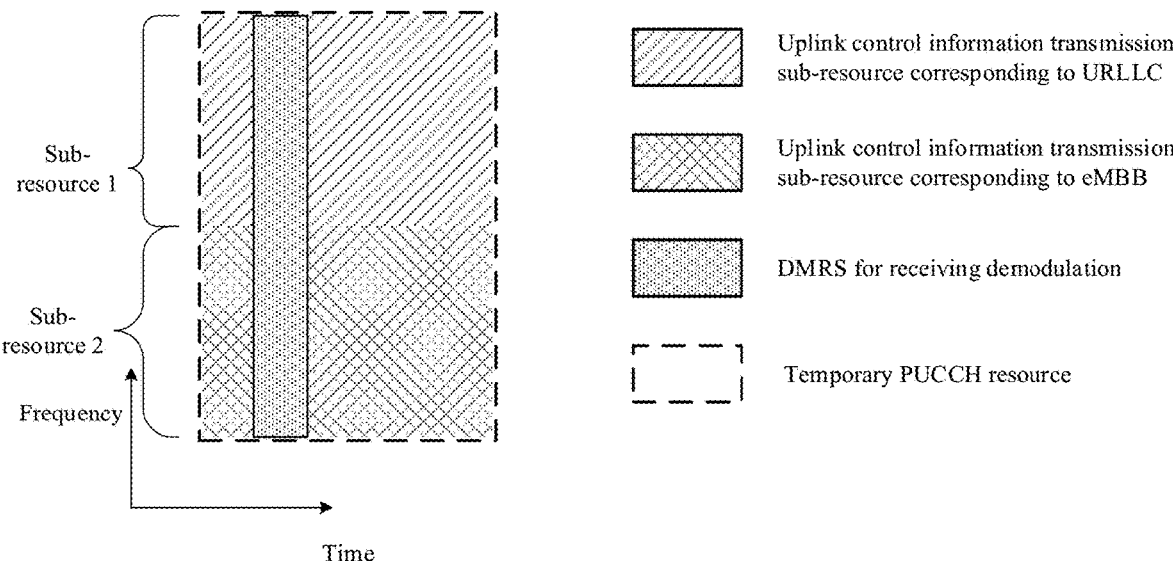
FIG. 6
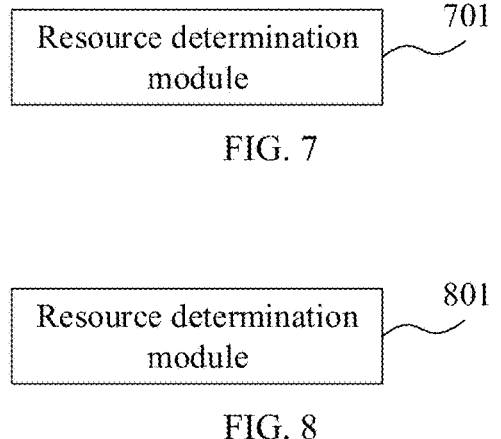
FIG. 7
FIG. 8
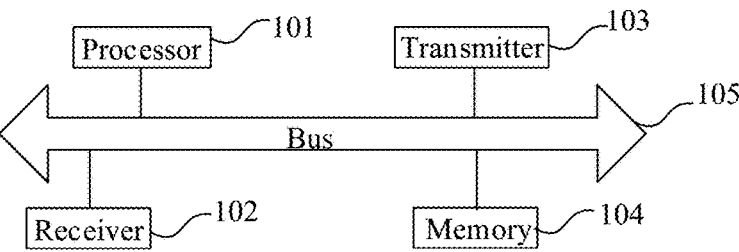
FIG. 9

UPLINK CONTROL INFORMATION SENDING METHOD AND RECEIVING METHOD, APPARATUSES, DEVICE, AND MEDIUM

CROSS-REFERENCE TO RELATED APPLICATION

This application is a continuation of PCT Application No. PCT/CN2021/071924, filed Jan. 14, 2021, the entire disclosure of which is incorporated herein by reference.

TECHNICAL FIELD

The present application relates to the field of communication technologies, and in particular, to a method for sending uplink control information, a method for receiving uplink control information, an apparatus, a device, and a medium.

BACKGROUND

In a New Radio (NR) system, there is Uplink Control Information (UCI) corresponding to different services or priorities.

In order to improve transmission efficiency, the uplink control information corresponding to different services or priorities supports simultaneous transmission, that is, transmission is performed on the same Physical Uplink Control Channel (PUCCH) resource.

How to perform resource allocation when the uplink control information corresponding to different services or priorities is transmitted on the same PUCCH resource, the related art has not yet provided a relatively good solution.

SUMMARY

Embodiments of the present application provide a method for sending uplink control information, a method for receiving uplink control information, an apparatus, a device, and a medium, which are used to realize simultaneous transmission of a plurality pieces of uplink control information. The technical solutions are as follows.

According to an aspect of the present application, a method for sending uplink control information is provided, which is applied to a terminal device, and the method includes:

determining a first transmission resource, where the first transmission resource is used for sending first uplink control information and second uplink control information;

where the first transmission resource includes: a first transmission sub-resource and a second transmission sub-resource, the first transmission sub-resource is used for carrying the first uplink control information, and the second transmission sub-resource is used for carrying the second uplink control information.

According to an aspect of the present application, a method for receiving uplink control information is provided, which is applied to a network device, and the method includes:

determining a first transmission resource, where the first transmission resource is used for receiving first uplink control information and second uplink control information;

where the first transmission resource includes: a first transmission sub-resource and a second transmission sub-resource, the first transmission sub-resource is used for carrying the first uplink control information, and the second transmission sub-resource is used for carrying the second uplink control information.

According to an aspect of the present application, there is provided an apparatus for sending uplink control information, which is applied to a terminal device, and the apparatus includes: a resource determination module;

the resource determination module is configured to determine a first transmission resource, where the first transmission resource is used for sending first uplink control information and second uplink control information;

where the first transmission resource includes: a first transmission sub-resource and a second transmission sub-resource, the first transmission sub-resource is used for carrying the first uplink control information, and the second transmission sub-resource is used for carrying the second uplink control information.

According to an aspect of the present application, there is provided an apparatus for receiving uplink control information, which is applied to network device, and the apparatus includes: a resource determination module;

the resource determination module is configured to determine a first transmission resource, where the first transmission resource is used for receiving first uplink control information and second uplink control information;

where the first transmission resource includes: a first transmission sub-resource and a second transmission sub-resource, the first transmission sub-resource is used for carrying the first uplink control information, and the second transmission sub-resource is used for carrying the second uplink control information.

According to an aspect of the present application, a terminal device is provided, the terminal device including: a processor and a transceiver connected to the processor; where the processor is configured to determine a first transmission resource, where the first transmission resource is used for the terminal device to send first uplink control information and second uplink control information;

where the first transmission resource includes: a first transmission sub-resource and a second transmission sub-resource, the first transmission sub-resource is used for carrying the first uplink control information, and the second transmission sub-resource is used for carrying the second uplink control information.

According to an aspect of the present application, a network device is provided, the network device including: a processor and a transceiver connected to the processor; where the processor is configured to determine a first transmission resource, where the first transmission resource is used for receiving first uplink control information and second uplink control information;

where the first transmission resource includes: a first transmission sub-resource and a second transmission sub-resource, the first transmission sub-resource is used for carrying the first uplink control information, and the second transmission sub-resource is used for carrying the second uplink control information.

According to an aspect of the present application, a computer-readable storage medium is provided, executable instructions are stored in the readable storage medium, and the executable instructions are loaded and executed by a processor to implement the method for sending uplink control information or the method for receiving uplink control information described in the above aspects.

According to an aspect of the embodiments of the present application, a chip is provided, the chip includes a programmable logic circuit and/or program instructions, and when the chip runs on a computer device, it is used for implementing the method for sending uplink control information or the method for receiving uplink control information described in the above aspects.

According to an aspect of the present application, a computer program product is provided. When the computer program product runs on a processor of a computer device, the computer device can execute the method for sending uplink control information or the method for receiving uplink control information described in the above aspects.

The technical solutions provided by the embodiments of the present application include at least the following beneficial effects.

In the case where two pieces of uplink control information need to be transmitted simultaneously, the terminal device or the network device determines one first transmission resource, and the first transmission resource may include two mutually independent sub-resources: the first transmission sub-resource and the second transmission sub-resource, the two independent sub-resources are respectively used for transmitting the two pieces of uplink control information, so that the two pieces of uplink control information can properly be transmitted simultaneously on the two sub-resources.

BRIEF DESCRIPTION OF THE DRAWINGS

In order to illustrate the technical solutions in the embodiments of the present application more clearly, the following briefly introduces the drawings that are used in the description of the embodiments. Obviously, the drawings in the following description are only some embodiments of the present application. For those of ordinary skill in the art, other drawings can also be obtained from these drawings without creative effort.

FIG. 1 is a block diagram of a communication system provided by an exemplary embodiment of the present application;

FIG. 2 is a flowchart of a method for transmitting uplink control information provided by an exemplary embodiment of the present application;

FIG. 3 is a schematic diagram of a transmission resource provided by an exemplary embodiment of the present application;

FIG. 6 is a schematic diagram of a transmission resource provided by an exemplary embodiment of the present application;

FIG. 7 is a structural block diagram of an apparatus for sending uplink control information provided by an exemplary embodiment of the present application;

FIG. 8 is a structural block diagram of an apparatus for receiving uplink control information provided by an exemplary embodiment of the present application;

FIG. 9 is a schematic structural diagram of a communication device provided by an exemplary embodiment of the present application.

DETAILED DESCRIPTION

Figure 4:
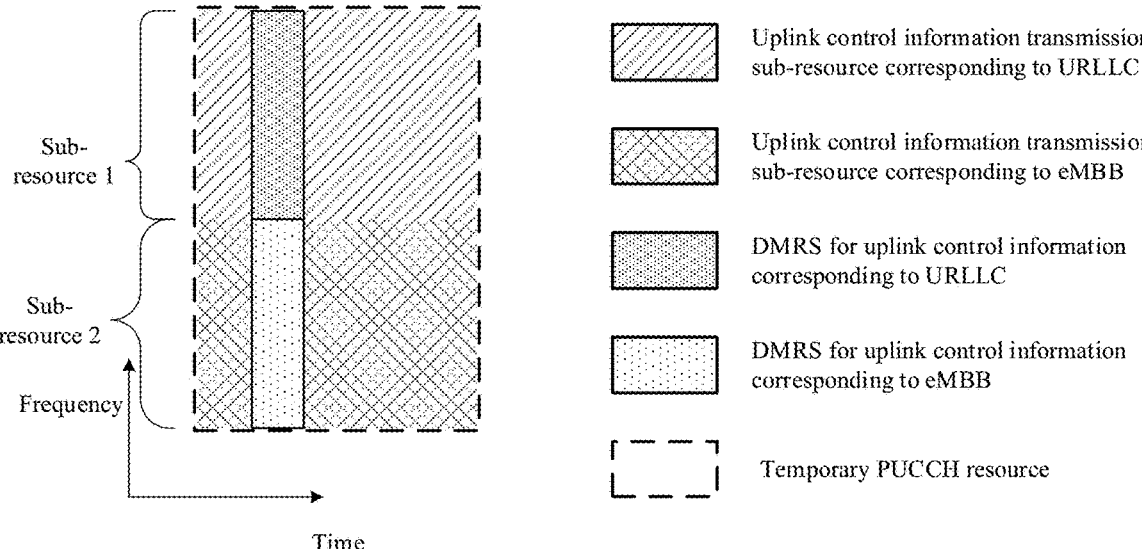
FIG. 4 is a schematic diagram of a transmission resource provided by an exemplary embodiment of the present application.

In order to make the objectives, technical solutions and advantages of the present application clearer, the embodiments of the present application will be further described in detail below with reference to the accompanying drawings.

The International Telecommunication Union (ITU) divides the services in the 5G NR system into three categories. The first category is enhance Mobile Broadband (eMBB), which is a 5G service type dedicated to mobile devices such as mobile phones. The second category is Ultra Reliable & Low Latency Communication (URLLC), which will be mainly used in industrial applications and autonomous vehicles. The third category is massive Machine Type of Communication (mMTC), mMTC is a service type that will be used in the "Internet of Things" and "Internet of Everything" scenarios, and the advantage of mMTC is that it allows a large number of adjacent devices to enjoy the smooth communication connection.

The 5G NR system has different requirements for the transmission reliabilities of the uplink control information of eMBB and URLLC. Therefore, different code rates can be used for the uplink control information of different services. In earlier versions, the uplink control information of two different services, eMBB and URLLC, was not allowed to be transmitted at the same time. That is, if the uplink control information of eMBB and URLLC needed to be transmitted at the same time, the terminal device would select the uplink control information of one of the services for transmission, while the uplink control information of the other service is discarded. In this way, since the discarded uplink control information will be regarded as a negative acknowledgement (Not Acknowledge, NACK) on the network side, the retransmission of the uplink control information will inevitably be caused, which has a certain impact on the system efficiency.

In order to improve the system efficiency, a scheme of simultaneous transmission of the uplink control information of eMBB and URLLC is proposed, that is, the uplink control information of eMBB and URLLC can be transmitted simultaneously through a certain rule.

Considering that the transmission reliability requirements of the uplink control information of eMBB and URLLC are different, the embodiment of the present application provides a method for determining a transmission resource, which can reduce the impact caused by different transmission reliability requirements when uplink control information of different services are simultaneously transmitted.

Hereinafter, the solutions provided by the present application are exemplarily described.

FIG. 1 shows a block diagram of a communication system provided by an exemplary embodiment of the present application. The communication system may include: an access network 12 and a terminal device 14.

The access network 12 includes several network devices 120. The network device 120 may be a base station, which is an apparatus deployed in an access network to provide a wireless communication function for a terminal. The base station may include various forms of macro base station, micro base station, relay station, access point and so on. In systems using different radio access technologies, the names of devices with base station functions may be different. For example, in LTE systems, they are called eNodeBs or eNBs; in 5G NR-U systems, they are called gNodeBs or gNBs. As communication technology evolves, the description of "base station" may change. For the convenience, in the embodiments of the present application, the above-mentioned apparatuses for providing a wireless communication function for the terminal device 14 are collectively referred to as network devices.

The terminal device 14 may include various handheld devices with wireless communication functions, vehicle-mounted devices, wearable devices, computing devices or other processing devices connected to wireless modems, as well as various forms of user equipment, Mobile Station (MS), terminal (terminal device), etc. For the convenience of description, the devices mentioned above are collectively referred to as terminal devices. The network device 120 and the terminal device 14 communicate with each other through a certain air interface technology, such as a Uu interface.

The technical solutions of the embodiments of the present application can be applied to various communication systems, such as: a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, an Advanced Long Term Evolution (LTE-A) system, a New Radio (NR) system, an evolution system of the NR system, an LTE-based access to Unlicensed spectrum (LTE-U) system, an NR-U system, a Universal Mobile Telecommunication System (UMTS), a Worldwide Interoperability for Microwave Access (WiMAX) communication system, Wireless Local Area Networks (WLAN), Wireless Fidelity (WiFi), a 6-Generation (6G) system, a next-generation communication system or other communication systems, etc.

Generally speaking, traditional communication systems support a limited number of connections, which are easy to be implemented. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, and Vehicle to everything (V2X) communication, etc. The embodiments of the present application can also be applied to these communication systems.

FIG. 2 shows a flowchart of a method for transmitting uplink control information provided by an exemplary embodiment of the present application. The method can be applied to the communication system as shown in FIG. 1, and the method includes the following steps.

In step 210: a first transmission resource is determined, where the first transmission resource is used for transmitting first uplink control information and second uplink control information, and the first transmission resource includes: a first transmission sub-resource and a second transmission sub-resource.

For the terminal device, step 210 is implemented as: determining a first transmission resource, the first transmission resource is used for sending the first uplink control information and the second uplink control information, and the first transmission resource includes: a first transmission sub-resource and a second transmission sub-resource.

For the network device, step 210 is implemented as: determining a first transmission resource, the first transmission resource is used for receiving the first uplink control information and the second uplink control information, and the first transmission resource includes: a first transmission sub-resource and a second transmission sub-resource.

In the case that two pieces of uplink control information need to be transmitted at the same time, the terminal device or the network device determines one first transmission resource for transmitting the two pieces of uplink control information.

The first transmission resource is a frequency domain resource, or a time domain resource, or a time-frequency resource used for uplink transmission. The first transmission resource may be a PUCCH resource. In the embodiments of the present application, the first transmission resource is used for transmitting the first uplink control information and the second uplink control information.

The first uplink control information and the second uplink control information are two different uplink control information. The uplink control information is the information sent by the terminal device to the network device to assist the transmission of the uplink and downlink data on the transmission channel. The uplink control information includes: Hybrid Automatic Repeat ReQuest Acknowledgement/Negative-Acknowledgement (HARQ ACK/NACK).

In the embodiments of the present application, the first transmission resource includes: a first transmission sub-resource and a second transmission sub-resource, the first transmission sub-resource is used for carrying the first uplink control information, and the second transmission sub-resource is used for carrying the second uplink control information. That is, the first transmission resource may include two sub-resources, and the two pieces of uplink control information are respectively transmitted on the two sub-resources.

It can be understood that the embodiments of the present application only use the first transmission resource to simultaneously transmit two pieces of uplink control information for exemplary description, and the first transmission resource may also be used for transmitting n pieces of uplink control information, the first transmission resource correspondingly includes n sub-resources, and the n pieces of uplink control information correspond to the n sub-resources one-to-one, where n is a positive integer greater than 1.

To sum up, in the method provided in this embodiment, when two pieces of uplink control information need to be transmitted at the same time, the terminal device or the network device determines one first transmission resource, and the first transmission resource may include two mutually independent sub-resources: the first transmission sub-resource and the second transmission sub-resource, the two independent sub-resources are respectively used for transmitting two pieces of uplink control information, so that the two uplink control information can be better simultaneously transmitted on the two sub-resources.

Hereinafter, the first uplink control information and the second uplink control information in the embodiments of the present application are exemplarily described.

Optionally, the first uplink control information and the second uplink control information correspond to different priorities; or, the first uplink control information and the second uplink control information correspond to different services.

Different uplink control information may correspond to different priorities. Exemplarily, the terminal device determines the priority of the uplink control information according to the configuration of the network device. For example, the terminal device may obtain the priority of the logical channel from the logical channel parameter (LogicalChannelConfig) configured by the network device, and then obtain the priority of the uplink control information related to the logical channel, and set the priority of the uplink control information to be equal to the priority of the logical channel. Exemplarily, the terminal device obtains the stored priority of the logical channel locally, and then obtains the priority of the uplink control information related to the logical channel, and sets the priority of the uplink control information to be equal to the priority of the logical channel.

In a possible implementation manner, the priority corresponding to the first uplink control information is higher than the priority corresponding to the second uplink control information.

Different uplink control information may correspond to different services. Optionally, the service includes: eMBB and URLLC. Exemplarily, the first uplink control information is uplink control information corresponding to URLLC, and the second uplink control information is uplink control information corresponding to eMBB. It can be understood that, with the evolution of communication technology, it is also possible to support simultaneous transmission of uplink control information corresponding to other types of services, and the embodiments of the present application do not limit the types of services.

Optionally, the first transmission resource is used for transmitting all the first uplink control information and all the second uplink control information; or, the first transmission resource is used for transmitting all the first uplink control information and part of the second uplink control information. That is, the first uplink control information and the second uplink control information include: all of the first uplink control information and all of the second uplink control information; or, all of the first uplink control information and part of the second uplink control information.

When the transmission reliability requirement of the first uplink control information is relatively high, the first transmission resource preferentially guarantees the transmission of the first uplink control information. Exemplarily, in the case where the first transmission resource supports complete transmission of both the first uplink control information and the second uplink control information, the first uplink control information and the second uplink control information include: all the first uplink control information and all the second uplink control information; in the case where the first transmission resource does not support complete transmission of both the first uplink control information and the second uplink control information, the first uplink control information and the second uplink control information include: all the first uplink control information and part of the second uplink control information.

It can be understood that, further, in the case where the first transmission resource can only support the transmission of the first uplink control information, the first uplink control information and the second uplink control information include: all the first uplink control information, or part of the first uplink control information. Correspondingly, at this time, the first transmission resource includes the first transmission sub-resource. That is, in an implementation manner, the first uplink control information and the second uplink control information include: all the first uplink control information, or part of the first uplink control information; or, all the first uplink control information and all the second uplink control information; or, all the first uplink control information and part of the second uplink control information.

Hereinafter, the first transmission sub-resource and the second transmission sub-resource in the embodiments of the present application are exemplarily described.

1) In the time domain: the first transmission sub-resource and the second transmission sub-resource partially overlap in the time domain; or, the first transmission sub-resource and the second transmission sub-resource completely overlap in the time domain.

Exemplarily, the time domain range of the first transmission sub-resource is the entire time domain range corresponding to the first transmission resource, and the time domain range of the second transmission sub-resource is part of the time domain range corresponding to the first transmission resource, then the first transmission sub-resource and the second transmission sub-resource partially overlap in the time domain.

Exemplarily, the time domain range of the first transmission sub-resource and the time domain range of the second transmission sub-resource are both the entire time domain range corresponding to the first transmission resource, then the first transmission sub-resource and the second transmission sub-resource completely overlap in the time domain.

2) In the frequency domain: the first transmission sub-resource and the second transmission sub-resource are continuous and do not overlap in the frequency domain.

Optionally, the starting position in the frequency domain of the first transmission sub-resource is the starting position in the frequency domain of the first transmission resource; the ending position in the frequency domain of the first transmission sub-resource is determined by the load and code rate of the first uplink control information.

The load of the first uplink control information refers to the number of bits included in the first uplink control information. The code rate of the first uplink control information refers to the coding rate of the first uplink control information.

Optionally, according to the load and code rate of the first uplink control information, the size of resource required for transmission of the first uplink control information can be determined, then in the case where the frequency domain starting position of the first transmission sub-resource is the frequency domain starting position of the first transmission resource, the terminal device determines the frequency domain ending position of the first transmission sub-resource according to the size of resource required for transmission of the first uplink control information and the determined frequency domain starting position of the first transmission sub-resource.

It can be understood that, in the case where the first transmission resource can only support the transmission of the first uplink control information, the first transmission resource only includes the first transmission sub-resource, and the frequency domain starting position of the first transmission sub-resource is the frequency domain starting position of the first transmission resource; the frequency domain ending position of the first transmission sub-resource is the frequency domain ending position of the first transmission resource. That is, in an implementation manner, the frequency domain ending position of the first transmission sub-resource is determined by the load and code rate of the first uplink control information, or the frequency domain ending position of the first transmission sub-resource is the frequency domain ending position of the first transmission resource.

Optionally, the frequency domain starting position of the second transmission sub-resource is located after and adjacent to the frequency domain ending position of the first transmission sub-resource; the frequency domain ending position of the second transmission sub-resource is determined by the load and the code rate of the second uplink control information, or, the frequency domain ending position of the second transmission sub-resource is the frequency domain ending position of the first transmission resource.

The load of the second uplink control information refers to the number of bits included in the second uplink control information. The code rate of the second uplink control information refers to the coding rate of the second uplink control information.

Since the first transmission sub-resource and the second transmission sub-resource are continuous in the frequency domain, the frequency domain starting position of the second transmission sub-resource is after the frequency domain ending position of the first transmission sub-resource and is adjacent to the first transmission sub-resource.

Optionally, according to the load and code rate of the second uplink control information, the size of the resource required for transmission of the second uplink control information can be determined, then in the case where the frequency domain starting position of the second transmission sub-resource is after and adjacent to the frequency domain ending position of the first transmission sub-resource, if the size of the resource required for the transmission of the second uplink control information is smaller than the remaining available resources of the first transmission resource, the frequency domain ending position of the second transmission sub-resource is determined by the load and code rate of the second uplink control information; if the size of the resource required for transmission of the second uplink control information is greater than the size of the remaining available resources of the first transmission resource, the frequency domain ending position of the second transmission sub-resource is the frequency domain ending position of the first transmission resource.

The size of the remaining available resource of the first transmission resource refers to the size of resource corresponding to the following time-frequency range: the frequency domain range is the frequency domain ending position of the first transmission sub-resource to the frequency domain ending position of the first transmission resource, the time domain range is the time domain range corresponding to the second transmission sub-resource. The time domain range corresponding to the second transmission sub-resource may be equal to the time domain range corresponding to the first transmission resource, or may be a subset of the time domain range corresponding to the first transmission resource.

Hereinafter, the code rate used for transmitting the first uplink control information and the second uplink control information in the embodiments of the present application is exemplarily described.

The code rate of the first uplink control information is independent of the code rate of the second uplink control information. That is, the code rate of the first uplink control information and the code rate of the second uplink control information do not affect each other. For example, when the code rate of the first uplink control information is adjusted, the code rate of the second uplink control information is not adjusted accordingly.

Optionally, the code rate of the first uplink control information is a code rate corresponding to a first temporary transmission resource, and the first temporary transmission resource is determined based on at least one of the PUCCH configuration of the first uplink control information, the load of the first uplink control information, or the resource indication of the first uplink control information.

The load of the first uplink control information refers to the number of bits included in the first uplink control information. The resource indication of the first uplink control information is used to indicate the first temporary transmission resource used for transmission of the first uplink control information in a temporary transmission resource set. Optionally, the resource indication of the first uplink control information is carried in Downlink Control Information (DCI). Optionally, the resource indication of the first uplink control information is carried in high-level signaling, and the high-level signaling is used to configure Semi-Persistent Scheduling (SPS) Physical Downlink Shared Channel (PDSCH) transmission.

Exemplarily, the network device performs PUCCH configuration for the terminal device, and the PUCCH configuration of the first uplink control information includes a plurality of temporary transmission resource sets. The load of the first uplink control information is used for the terminal device to determine a temporary transmission resource set used for transmitting the first uplink control information among the plurality of temporary transmission resource sets, and the resource indication of the first uplink control information is used for the terminal device to determine a first temporary transmission resource used for transmitting the first uplink control information in the temporary transmission resource set.

Optionally, the code rate of the second uplink control information is a code rate corresponding to a second temporary transmission resource, and the second temporary transmission resource is determined based on at least one of the PUCCH configuration of the second uplink control information, the load of the second uplink control information, or the resource indication of the second uplink control information.

The load of the second uplink control information refers to the number of bits included in the second uplink control information. The resource indication of the second uplink control information is used to indicate a second temporary transmission resource used for transmission of the second uplink control information in one temporary transmission resource set. Optionally, the resource indication of the second uplink control information is carried in the DCI. Optionally, the resource indication of the second uplink control information is carried in high-level signaling, and the high-level signaling is used to configure SPS PDSCH transmission.

Exemplarily, the network device performs PUCCH configuration for the terminal device, and the PUCCH configuration of the second uplink control information includes a plurality of temporary transmission resource sets. The load of the second uplink control information is used for the terminal device to determine a temporary transmission resource set used for transmitting the second uplink control information among the plurality of temporary transmission resource sets, and the resource indication of the second uplink control information is used for the terminal device to determine a second temporary transmission resource used for transmitting the second uplink control information in the temporary transmission resource set.

Optionally, in the embodiments of the present application, the first transmission resource includes: a first temporary transmission resource; or, a second temporary transmission resource. Correspondingly, step 210 may be alternatively implemented as: determining the first temporary transmission resource as the first transmission resource, and the first temporary transmission resource is determined based on at least one of the PUCCH configuration of the first uplink control information, the load of the first uplink control information, or the resource indication of the first uplink control information, where the first transmission resource includes: a first transmission sub-resource and a second transmission sub-resource. Alternatively, step 210 may be alternatively implemented as: determining the second temporary transmission resource as the first transmission resource, and the second temporary transmission resource is determined based on at least one of the PUCCH configuration of the second uplink control information, the load of the second uplink control information, or the resource indication of the second uplink control information, where the first transmission resource includes: a first transmission sub-resource and a second transmission sub-resource.

The manner of determining the first temporary transmission resource and the second temporary transmission resource has been introduced above, and will not be repeated here.

Hereinafter, the transmission of reference information for demodulating the first uplink control information and the second uplink control information in the embodiments of the present application is exemplarily described.

For the terminal device, the first transmission sub-resource includes a resource used for sending first reference information, and the first reference information is used for demodulation of the first uplink control information; the second transmission sub-resource includes a resource used for sending second reference information resource, and the second reference information is used for demodulation of the second uplink control information.

For the network device, the first transmission sub-resource includes a resource for receiving first reference information, and the first reference information is used for demodulation of the first uplink control information; the second transmission sub-resource includes a resource for receiving second reference information resource, and the second reference information is used for demodulation of the second uplink control information.

Optionally, the first reference information and the second reference information are Demodulation Reference Signals (DMRSs).

In a possible implementation manner, the first reference information and the second reference information are generated independently of each other. That is, the terminal device independently generates the first reference information for the demodulation of the first uplink control information, and independently generates the second reference information for the demodulation of the second uplink control information.

In another possible implementation manner, the first reference information and the second reference information are generated in association with each other. That is, the first reference information and the second reference information are not separately generated, respectively.

Optionally, the first reference information is a part of third reference information, the second reference information is a remaining part of the third reference information after removing the first reference information, and the third reference information is determined according to configuration information. The configuration information is used for generating the third reference information. Optionally, the configuration information includes at least one of DMRS port information and DMRS sequence index information. Optionally, the configuration information is carried in the DCI, or the configuration information is carried in the RRC message.

Exemplarily, the third reference information generated by the terminal device is used to demodulate the first uplink control information and the second uplink control information, where the first reference information in the third reference information is used to demodulate the first uplink control information, the remaining third reference information is the second reference information, and the second reference information is used for demodulation of the second uplink control information.

Exemplarily, the above embodiments are exemplarily described with reference to the following examples.

The terminal device supports URLLC and eMBB services, but these two services have different requirements on the transmission reliability of uplink control information. Therefore, if these two services are transmitted at the same time, the receiving processes of uplink control information corresponding to the two services are mutually independent, which is more conducive to realize different transmission reliability requirements. Therefore, during resource allocation, the resources allocated to the uplink control information corresponding to the two services are as independent as possible in the frequency domain. The specific implementation manners are as follows.

Since the transmission reliability requirement of the uplink control information of URLLC is relatively high, the transmission resource of the uplink control information of URLLC is guaranteed first. The terminal device determines the temporary PUCCH resource (that is, the first temporary transmission resource in this application) according to the uplink control information of the URLLC, and the temporary PUCCH resource is used for carrying the following information: the uplink control information of the URLLC (that is, the first uplink control information in this application) and the uplink control information of the eMBB (that is, the second uplink control information in this application) and the DMRS used for demodulation.

The code rate used by the uplink control information of URLLC during transmission is independent of the code rate used by the uplink control information of eMBB during transmission, and the priorities corresponding to the uplink control information of the two services are different, and the uplink control information of URLLC corresponds to a higher priority.

The uplink control information carried by the temporary PUCCH resource may be all the uplink control information of URLLC, may be part of the uplink control information of URLLC, may be all uplink control information of URLLC and all uplink control information of eMBB, may be all uplink control information of URLLC and part of the uplink control information of eMBB.

During resource allocation, the transmission sub-resource used by the uplink control information of the URLLC and the transmission sub-resource used by the uplink control information of the eMBB do not overlap in the frequency domain, but partially or completely overlap in the time domain.

Figure 5:
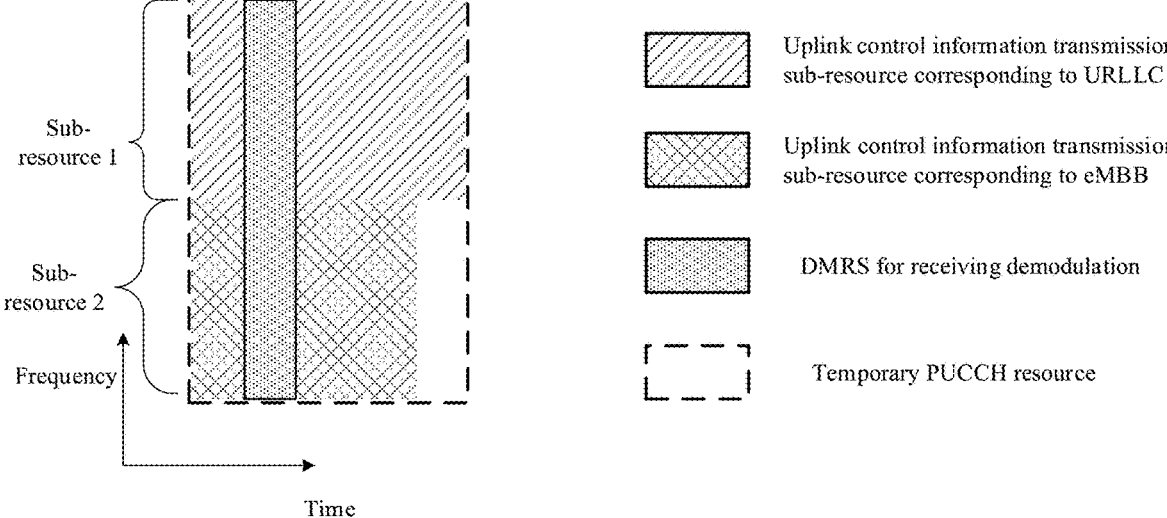
FIG. 5 is a schematic diagram of a transmission resource provided by an exemplary embodiment of the present application.

Referring to FIGS. 3 to 6, the transmission sub-resource of the uplink control information corresponding to URLLC is sub-resource 1 (that is, the first transmission sub-resource in this application), the transmission sub-resource of the uplink control information corresponding to eMBB is sub-resource 2 (that is, the second transmission sub-resource in this application), and sub-resource 1 and sub-resource 2 do not overlap in the frequency domain. In one possible case, as shown in FIG. 3 and FIG. 5, sub-resource 1 and sub-resource 2 partially overlap in the time domain; in another possible case, as shown in FIG. 4 and FIG. 6, sub-resource 1 and sub-resource 2 completely overlap in the time domain.

The frequency domain starting position of sub-resource 1 is the starting position of the temporary PUCCH resource, and its frequency domain ending position is determined by the load and code rate of the uplink control information of the URLLC, or the frequency domain ending position is the frequency domain ending position of the temporary PUCCH resource.

The frequency domain starting position of sub-resource 2 is the adjacent position after the frequency domain ending position of sub-resource 1, and its frequency domain ending position is determined by the load and code rate of the uplink control information of the eMBB, or the frequency domain ending position is the frequency domain ending position of the temporary PUCCH resource.

The temporary URLLC resource includes a resource for transmitting DMRS, and the DMRS is used for receiving and demodulate the uplink control information transmitted in the temporary URLLC resource, that is, the DMRS used for receiving and demodulating includes the DMRS used for the uplink control information corresponding to the URLLC and DMRS used for uplink control information corresponding to eMBB.

In a possible case, as shown in FIG. 3 and FIG. 4, the DMRS used for the uplink control information corresponding to URLLC and the DMRS used for the uplink control information corresponding to eMBB may be generated independently; in another possible case, as shown in FIG. 5 and FIG. 6, it is also possible to generate a set of DMRS for reception and demodulation, one part of which is used for URLLC and the other part is used for eMBB.

It should be noted that, the foregoing method embodiments may be implemented separately, or may be implemented in combination, which is not limited in the present application.

In each of the above embodiments, the steps performed by the terminal device can be independently implemented as a method for determining a transmission resource on the terminal device side, and the steps performed by the network device can be implemented independently as a method for determining a transmission resource on the network device side.

FIG. 7 shows a structural block diagram of an apparatus for sending uplink control information provided by an exemplary embodiment of the present application. The apparatus may be implemented as a terminal device, or may be implemented as a part of the terminal device. The apparatus includes: a resource determination module 701;

the resource determination module 701 is configured to determine a first transmission resource, where the first transmission resource is used for sending first uplink control information and second uplink control information;

where the first transmission resource includes: a first transmission sub-resource and a second transmission sub-resource, the first transmission sub-resource is used for carrying the first uplink control information, and the second transmission sub-resource is used for carrying the second uplink control information.

In an optional embodiment, the first transmission resource is used for sending all the first uplink control information and all the second uplink control information; or, the first transmission resource is used for sending all the first uplink control information and part of the second uplink control information.

In an optional embodiment, the first uplink control information and the second uplink control information correspond to different priorities; or, the first uplink control information and the second uplink control information correspond to different services.

In an optional embodiment, the first transmission sub-resource and the second transmission sub-resource partially overlap in the time domain; or, the first transmission sub-resource and the second transmission sub-resource are completely overlap in the time domain.

In an optional embodiment, the first transmission sub-resource and the second transmission sub-resource are continuous and do not overlap in the frequency domain.

In an optional embodiment, the frequency domain starting position of the first transmission sub-resource is the frequency domain starting position of the first transmission resource; the frequency domain ending position of the first transmission sub-resource is determined by the load and code rate of the first uplink control information.

In an optional embodiment, the frequency domain starting position of the second transmission sub-resource is located after the frequency domain ending position of the first transmission sub-resource and is adjacent to the first transmission sub-resource; the frequency domain ending position of the second transmission sub-resource is determined by the load and code rate of the second uplink control information, or the frequency domain ending position of the second transmission sub-resource is the frequency domain ending position of the first transmission resource.

In an optional embodiment, the code rate of the first uplink control information is independent of the code rate of the second uplink control information.

In an optional embodiment, the code rate of the first uplink control information is a code rate corresponding to a first temporary transmission resource, and the first temporary transmission resource is determined according to at least one of a PUCCH configuration of the first uplink control information, the load of the first uplink control information or the resource indication of the first uplink control information.

In an optional embodiment, the code rate of the second uplink control information is a code rate corresponding to a second temporary transmission resource, and the second temporary transmission resource is determined according to at least one of a PUCCH configuration of the second uplink control information, the load of the second uplink control information or the resource indication of the second uplink control information.

In an optional embodiment, the resource determination module 701 is configured to determine the first temporary transmission resource as the first transmission resource, where the first temporary transmission resource is determined according to at least one of the PUCCH configuration of the first uplink control information, the load of the first uplink control information, or the resource indication of the first uplink control information;

or, the resource determination module 701 is configured to determine the second temporary transmission resource as the first transmission resource, where the second temporary transmission resource is determined according to at least one of a PUCCH configuration of the second uplink control information, the load of the second uplink control information or the resource indication of the second uplink control information.

In an optional embodiment, the first transmission sub-resource includes a resource for sending first reference information, where the first reference information is used for demodulation of the first uplink control information; the second transmission sub-resource includes a resource for sending second reference information, where the second reference information is used for demodulation of the second uplink control information.

In an optional embodiment, the first reference information and the second reference information are generated independently of each other.

In an optional embodiment, the first reference information and the second reference information are generated in association with each other.

In an optional embodiment, the first reference information is a part of third reference information, the second reference information is a remaining part of the third reference information after removing the first reference information, and the third reference information is determined according to configuration information, and the configuration information is used for generating the third reference information.

FIG. 8 shows a structural block diagram of an apparatus for receiving uplink control information provided by an exemplary embodiment of the present application. The apparatus may be implemented as a network device, or may be implemented as a part of a network device, and the device includes: a resource determination module 801;

the resource determination module 801 is configured to determine a first transmission resource, where the first transmission resource is used for receiving first uplink control information and second uplink control information;

where the first transmission resource includes: a first transmission sub-resource and a second transmission sub-resource, the first transmission sub-resource is used for carrying the first uplink control information, and the second transmission sub-resource is used for carrying the second uplink control information.

In an optional embodiment, the first transmission resource is used for receiving all the first uplink control information and all the second uplink control information; or, the first transmission resource is used for receiving all the first uplink control information and part of the second uplink control information.

In an optional embodiment, the first uplink control information and the second uplink control information correspond to different priorities; or, the first uplink control information and the second uplink control information correspond to different services.

In an optional embodiment, the first transmission sub-resource and the second transmission sub-resource partially overlap in the time domain; or, the first transmission sub-resource and the second transmission sub-resource completely overlap in the time domain.

In an optional embodiment, the first transmission sub-resource and the second transmission sub-resource are continuous and do not overlap in the frequency domain.

In an optional embodiment, the frequency domain starting position of the first transmission sub-resource is the frequency domain starting position of the first transmission resource; the frequency domain ending position of the first transmission sub-resource is determined by the load and code rate of the first uplink control information.

In an optional embodiment, the frequency domain starting position of the second transmission sub-resource is located after the frequency domain ending position of the first transmission sub-resource and is adjacent to the first transmission sub-resource; the frequency domain ending position of the second transmission sub-resource is determined by the load and code rate of the second uplink control information, or the frequency domain ending position of the second transmission sub-resource is the frequency domain ending position of the first transmission resource.

In an optional embodiment, the code rate of the first uplink control information is independent of the code rate of the second uplink control information.

In an optional embodiment, the code rate of the first uplink control information is a code rate corresponding to a first temporary transmission resource, and the first temporary transmission resource is determined according to at least one of a PUCCH configuration of the first uplink control information, the load of the first uplink control information or the resource indication of the first uplink control information.

In an optional embodiment, the code rate of the second uplink control information is a code rate corresponding to a second temporary transmission resource, and the second temporary transmission resource is determined according to at least one of a PUCCH configuration of the second uplink control information, the load of the second uplink control information or the resource indication of the second uplink control information.

In an optional embodiment, the resource determination module 801 is configured to determine a first temporary transmission resource as the first transmission resource, where the first temporary transmission resource is determined according to at least one of the PUCCH configuration of the first uplink control information, the load of the first uplink control information, or the resource indication of the first uplink control information;

or, the resource determination module 801 is configured to determine a second temporary transmission resource as the first transmission resource, where the second temporary transmission resource is determined according to at least one of a PUCCH configuration of the second uplink control information, a load of the second uplink control information or the resource indication of the second uplink control information.

In an optional embodiment, the first transmission sub-resource includes a resource for receiving first reference information, where the first reference information is used for demodulation of the first uplink control information; the second transmission sub-resource includes a resource for receiving second reference information, where the second reference information is used for demodulation of the second uplink control information.

In an optional embodiment, the first reference information and the second reference information are generated independently of each other.

In an optional embodiment, the first reference information and the second reference information are generated in association with each other.

In an optional embodiment, the first reference information is a part of third reference information, the second reference information is a remaining part of the third reference information after removing the first reference information, and the third reference information is determined according to configuration information, and the configuration information is used for generating the third reference information.

FIG. 9 shows a schematic structural diagram of a communication device (such as a terminal device or a network device) provided by an exemplary embodiment of the present application. The communication device includes: a processor 101, a receiver 102, a transmitter 103, a memory 104 and a bus 105.

The processor 101 includes one or more processing cores, and the processor 101 executes various functional applications and information processing by running software programs and modules.

The receiver 102 and the transmitter 103 may be implemented as one communication component, and the communication component may be a communication chip, denoted as a transceiver.

The memory 104 is connected to the processor 101 through the bus 105.

The memory 104 may be configured to store at least one instruction, and the processor 101 is configured to execute the at least one instruction, so as to implement various steps in the foregoing method embodiments.

Additionally, the memory 104 may be implemented by any type or combination of volatile or non-volatile storage devices including, but not limited to, a magnetic or optical disk, an Electrically-Erasable Programmable Read Only Memory (EEPROM), an Erasable Programmable Read Only Memory (EPROM), a Static Random Access Memory (SRAM), a Read-Only Memory (ROM), a magnetic memory, a flash memory, a Programmable Read-Only Memory (PROM).

When the communication device is implemented as a terminal device, the processor and transceiver in the communication device involved in the embodiments of the present application may perform the steps performed by the terminal device in any of the methods shown in FIG. 2 to FIG. 6 above, which will not be repeated here.

In a possible implementation manner, when the communication device is implemented as a terminal device, the processor is configured to determine a first transmission resource, where the first transmission resource is used for sending first uplink control information and second uplink control information;

where the first transmission resource includes: a first transmission sub-resource and a second transmission sub-resource, the first transmission sub-resource is used for carrying the first uplink control information, and the second transmission sub-resource is used for carrying the second uplink control information.

When the communication device is implemented as a network device, the processor and transceiver in the communication device involved in the embodiments of the present application may perform the steps performed by the network device in any of the methods shown in the foregoing FIG. 2 to FIG. 6, which will not be repeated here.

In a possible implementation manner, when the communication device is implemented as a network device, the processor is configured to determine a first transmission resource, where the first transmission resource is used for receiving first uplink control information and second uplink control information;

where the first transmission resource includes: a first transmission sub-resource and a second transmission sub-resource, the first transmission sub-resource is used for carrying the first uplink control information, and the second transmission sub-resource is used for carrying the second uplink control information.

In an exemplary embodiment, a computer-readable storage medium is also provided, where the computer-readable storage medium stores at least one instruction, at least one section of program, code set or instruction set, the at least one instruction, the at least one section of program, the code set or the instruction set is loaded and executed by the processor to implement the method for sending uplink control information or the method for receiving uplink control information provided by the above method embodiments and executed by the communication device.

In an exemplary embodiment, a chip is also provided, the chip includes a programmable logic circuit and/or program instructions, and when the chip runs on a computer device, it is used to implement the method for sending uplink control information or the method for receiving uplink control information described in the above aspects.

In an exemplary embodiment, a computer program product is also provided, when the computer program product is run on the processor of the computer device, the computer program product causes the computer device to execute the method for sending uplink control information or the method for receiving uplink control information described in the above aspects.

Those of ordinary skill in the art can understand that all or part of the steps of implementing the above embodiments can be completed by hardware, or can be completed by instructing relevant hardware through a program, and the program can be stored in a computer-readable storage medium. The above-mentioned storage medium may be a read-only memory, a magnetic disk or an optical disk, etc.

The above descriptions are only optional embodiments of the present application, and are not intended to limit the present application. Any modifications, equivalent replacements, improvements, etc. made within the spirit and principles of the present application shall be included in the protection scope of the present application.

What is claimed is:

1. A method for sending uplink control information, applied to a terminal device, the method comprising:

determining a first transmission resource, wherein the first transmission resource is used for sending first uplink control information and second uplink control information;

wherein the first transmission resource comprises: a first transmission sub-resource and a second transmission sub-resource, the first transmission sub-resource is used for carrying the first uplink control information, and the second transmission sub-resource is used for carrying the second uplink control information;

a priority corresponding to the first uplink control information is higher than a priority corresponding to the second uplink control information;

the first transmission sub-resource and the second transmission sub-resource are contiguous and non-overlapping in a frequency domain;

a frequency domain starting position of the first transmission sub-resource is a frequency domain starting position of the first transmission resource;

a frequency domain ending position of the first transmission sub-resource is determined by a load and a code rate of the first uplink control information.

2. The method according to claim 1, wherein:

the first transmission resource is used for sending all the first uplink control information and all the second uplink control information;

or, the first transmission resource is used for sending all the first uplink control information and part of the second uplink control information.

3. The method according to claim 1, wherein:

the first transmission sub-resource and the second transmission sub-resource partially overlap in a time domain;

or, the first transmission sub-resource and the second transmission sub-resource completely overlap in the time domain.

4. The method according to claim 1, wherein:

a frequency domain starting position of the second transmission sub-resource is located after a frequency domain ending position of the first transmission sub-resource and is adjacent to the first transmission sub-resource;

a frequency domain ending position of the second transmission sub-resource is determined by a load and a code rate of the second uplink control information, or the frequency domain ending position of the second transmission sub-resource is a frequency domain ending position of the first transmission resource.

5. The method according to claim 1, wherein:

the code rate of the first uplink control information is independent of a code rate of the second uplink control information.

6. The method according to claim 5, wherein:

the code rate of the first uplink control information is a code rate corresponding to a first temporary transmission resource, and the first temporary transmission resource is determined based on at least one of a physical uplink control channel (PUCCH) configuration of the first uplink control information, a load of the first uplink control information or a resource indication of the first uplink control information.

7. The method according to claim 5, wherein:

the code rate of the second uplink control information is a code rate corresponding to a second temporary transmission resource, and the second temporary transmission resource is determined based on at least one of a PUCCH configuration of the second uplink control information, a load of the second uplink control information or a resource indication of the second uplink control information.

8. The method according to claim 1, wherein determining the first transmission resource comprises:

determining a first temporary transmission resource as the first transmission resource, wherein the first temporary transmission resource is determined based on at least one of a PUCCH configuration of the first uplink control information, a load of the first uplink control information or a resource indication of the first uplink control information;

or, determining a second temporary transmission resource as the first transmission resource, wherein the second temporary transmission resource is determined based on at least one of a PUCCH configuration of the second uplink control information, a load of the second uplink control information or a resource indication of the second uplink control information.

9. The method according to claim 1, wherein:

the first transmission sub-resource comprises a resource for sending first reference information, wherein the first reference information is used for demodulation of the first uplink control information;

the second transmission sub-resource comprises a resource for sending second reference information, wherein the second reference information is used for demodulation of the second uplink control information.

10. The method according to claim 9, wherein:

the first reference information and the second reference information are generated independently of each other, or, the first reference information and the second reference information are generated in association with each other.

11. The method according to claim 10, wherein:

the first reference information is a part of third reference information, the second reference information is a remaining part of the third reference information after removing the first reference information, the third reference information is determined according to configuration information, and the configuration information is used for generating the third reference information.

12. An apparatus for sending uplink control information, applied to a terminal device, the apparatus comprising: a processor and a transceiver connected to the processor;

wherein the processor is configured to determine a first transmission resource, and the first transmission resource is used for sending first uplink control information and second uplink control information;

wherein the first transmission resource comprises: a first transmission sub-resource and a second transmission sub-resource, the first transmission sub-resource is used for carrying the first uplink control information, and the second transmission sub-resource is used for carrying the second uplink control information;

a priority corresponding to the first uplink control information is higher than a priority corresponding to the second uplink control information;

the first transmission sub-resource and the second transmission sub-resource are contiguous and non-overlapping in a frequency domain;

a frequency domain starting position of the first transmission sub-resource is a frequency domain starting position of the first transmission resource;

a frequency domain ending position of the first transmission sub-resource is determined by a load and a code rate of the first uplink control information.

13. The apparatus according to claim 12, wherein:

the first transmission resource is used for sending all the first uplink control information and all the second uplink control information;

or, the first transmission resource is used for sending all the first uplink control information and part of the second uplink control information.

14. An apparatus for receiving uplink control information, applied to a network device, the apparatus comprising:

a processor and a transceiver connected to the processor;

wherein the processor is configured to determine a first transmission resource, and the first transmission resource is used for receiving first uplink control information and second uplink control information;

wherein the first transmission resource comprises: a first transmission sub-resource and a second transmission sub-resource, the first transmission sub-resource is used for carrying the first uplink control information, and the second transmission sub-resource is used for carrying the second uplink control information;

a priority corresponding to the first uplink control information is higher than a priority corresponding to the second uplink control information;

the first transmission sub-resource and the second transmission sub-resource are contiguous and non-overlapping in a frequency domain;

a frequency domain starting position of the first transmission sub-resource is a frequency domain starting position of the first transmission resource;

a frequency domain ending position of the first transmission sub-resource is determined by a load and a code rate of the first uplink control information.

15. The apparatus according to claim 14, wherein:

the first transmission resource is used for receiving all the first uplink control information and all the second uplink control information;

or, the first transmission resource is used for receiving all the first uplink control information and part of the second uplink control information.

* * * * *